(No Model.)
F. E. YOUNGS.
PROPORTIONAL METER.
No. 412,824. Patented Oct. 15, 1889.
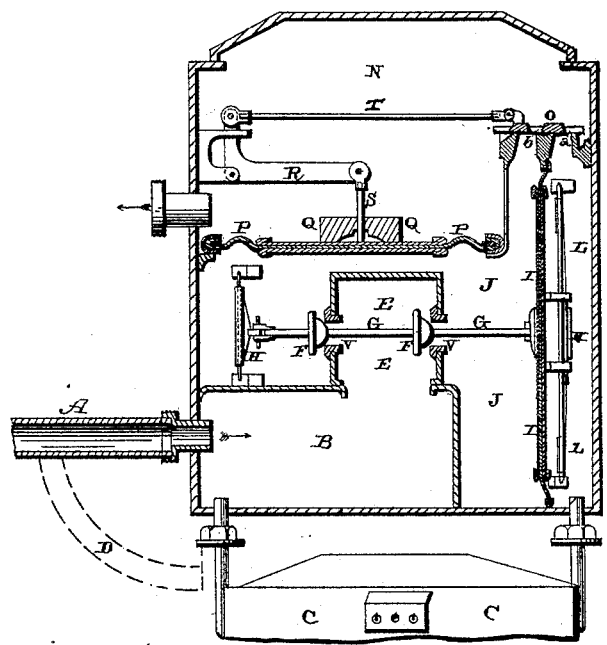
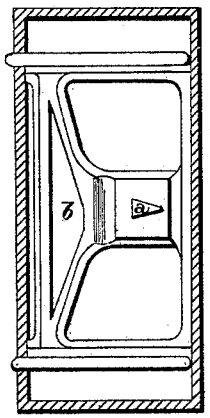
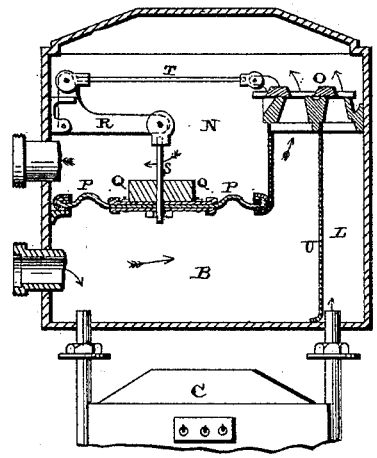
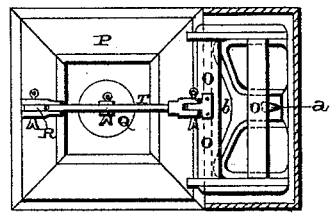
Witnesses
Edm. P. Ellis
L. L. Burket
Inventor
F. E. Youngs,
per F. A. Lehmann,
atty.

UNITED STATES PATENT OFFICE.

FRED E. YOUNGS, OF PITTSBURG, PENNSYLVANIA.

PROPORTIONAL METER.

SPECIFICATION forming part of Letters Patent No. 412,824, dated October 15, 1889.

Application filed July 7, 1888. Serial No. 279,303. (No model.)

*To all whom it may concern:*

Be it known that I, FRED E. YOUNGS, of Pittsburg, in the county of Allegheny and State of Pennsylvania, have invented certain new and useful Improvements in Proportional Meters; and I do hereby declare the following to be a full, clear, and exact description of the invention, such as will enable others skilled in the art to which it pertains to make and use the same, reference being had to the accompanying drawings, which form part of this specification.

My invention relates to an improvement in proportional meters; and it consists in, first, the combination of an inlet-pipe from which a portion of the gas is allowed to pass through the meter to be measured and the other portion allowed to pass to the larger opening of a proportional valve, a partition which separates the gas which is passed from the meter from the gas which is shunted by the meter, and a weighted diaphragm adapted to control the action of the proportional valve; second, the combination of the inlet-pipe, from which a portion of the gas is allowed to pass through the meter to be measured and the other portion through a balance-valve to the larger opening of a proportional valve, and a diaphragm which separates the gas which has passed through the meter from the gas which has passed through the balance-valve, and which operates the balance-valve so as to equalize the pressure upon the two openings of the proportional valve.

The objects of my invention are to provide a proportional meter in which the friction of the meter used to measure the smaller portion of gas is not allowed to affect the ratio of the gas which passes through the proportional valve, and to so construct the parts that changes in the pressure of the gas shall not change the ratio between the volume of gas which is shunted past the meter and that which is passed through the meter to be measured.

Heretofore in proportional meters the parts have been so constructed that changes in pressure have produced a change in the ratio between the measured and unmeasured volume of gases due to variations in the friction of the meter used for measuring the smaller portions of the gas and to an unequal fall of pressure in passing through the proportional valves.

Figure 1 is a vertical section of a proportional meter which embodies my invention. Fig. 2 is also a sectional view of a meter which is a modification of what is shown in Fig. 1. Fig. 3 is a plan view of the proportional valve and its mechanism. Fig. 4 is a plan view of the valve-seat alone.

A represents the supply-pipe, from which the gas may be discharged directly into the chamber B, and from this chamber a portion is taken through the meter C, or that portion of gas which is to pass through the meter C may be taken from the pipe direct and passed through the pipe D, as shown in dotted lines, without ever passing through the chamber B. In the upper portion of this chamber B is formed a valve-chamber E, in which the valve F is placed, which is preferably made double, or in the form of a balanced valve, as shown, when the two valves F are secured to the valve-rod G. They are preferably made egg-shaped, or in such a form that in any position the amount of opening through which the gas has to pass bears the same ratio to the total opening in the valve-seats V that the position of the valve at that point of the stroke bears to the total stroke of the valve, or, in other words, when the valves are at half-stroke the area through which the gas has to pass is one-half of the total area of the valve when wide open or at full stroke. The valve-rod G is supported at one or both ends by hinges H and H, or any other suitable means adapted to allow a nearly frictionless motion, and is connected at one end to a flexible diaphragm I, which serves to separate the measured and unmeasured portions of gas, and to equalize their pressure in the chambers J L. That portion of the gas which passes through the meter for the purpose of being measured passes into the chamber L, and accumulates therein until its pressure against the diaphragm causes the valve F to open sufficiently to allow enough gas to pass into the chamber J to exactly counterbalance the pressure in the chamber L. In the upper portion of both of the chambers J and L, or at any other convenient position that may be preferred, is placed the proportional valve, the openings of which, no matter whether made through the valve-seat or the valve itself, bear a determined ratio or proportion to each other, through which the gas escapes into the chamber N. As here shown, these openings a b are located in the upper portions of the chambers J and L; but they may be located in any other position that may be preferred, as I do not limit myself to any exact location, as they will act as well in one position as another, provided the two openings in the valve are connected either directly or indirectly with the two chambers J and L.

It is immaterial whether the proportional openings are made through the valve-seat or the valve. When made through the valve, they are easier to get at and easier to make repairs. As here shown, the two openings are made triangular in shape and bear a certain determined proportion to each other, so that the quantity of gas which passes through the larger opening will be a multiple of that which passes through the smaller one. The valve O is used to control these openings, and is made substantially as shown in Fig. 3, and no matter how wide the valve may be opened or how near it may be closed the ratio of gas passing through the two openings will always remain the same. The apexes of the triangular openings in the valve may be cut off or closed up, so that the width of the apex of the smaller opening would not become too narrow for practical construction in maintaining the ratio determined. These openings are preferably made triangular for two reasons: first, because the width of the larger opening in the valve-seat becomes sufficiently narrow at the apex to prevent any lost motion in the valve, due to wear of the guides of the valve, from materially affecting the form of the larger opening through which the gas is passing at a time when the valve is nearly closed; second, a longer stroke of the valve and weighted diaphragm is required to produce a given increase or decrease in the area of the openings in the valve than would be required if the valve were not narrowed up on its closing side. This effectually prevents fluttering of the weighted diaphragm, as the adjustments of the valve to the changing conditions of flow are made gradually and not so quickly as to cause excessive changes in the relative pressure in the inlet and outlet chambers before the diaphragm could come to rest.

The diaphragm P, which forms a portion of the top of the chamber J, against which the volume of gas exerts a lifting pressure, is provided with a weight Q, which is proportioned to the area of the diaphragm, so as to cause a fall in the pressure due to the throttling of the gas as it passes through the valve O into the chamber N. Pivoted in this chamber N is the lever R, which is connected by the rod S with the diaphragm P at one end and by the rod T with the valve O at the other. As this diaphragm rises and falls, the valve O is made to open and close the proportional openings for the purpose of turning on or shutting off the gas, so as to maintain a certain difference of pressure between the chambers J and L and the chamber N. If the weight Q were not used, the pressure of the gas in the chamber J, being greater than that in the chamber N, would cause the diaphragm to rise and to open the valve so as to allow the gas to pass freely into the chamber N, and thus always maintain an equilibrium with nearly an equal pressure in the chambers J, L, and N. As the gas is throttled by passing through the valve O, there is a fall of pressure in passing to the chamber N, and this weight Q serves to make up for this fall of pressure and to weight the diaphragm, so that when the flow of gas away from the chamber N is reduced or cut off the pressure of the gas and the weight upon the upper side of the diaphragm cause the valve O to immediately reduce the area of the openings in the valve, or close it entirely. When the flow of gas from the chamber N is again started, the greater pressure of gas against the under side of the diaphragm causes this diaphragm to rise and open the valve so that the gas will pass from the chambers J and L into the chamber N.

The friction in the meter would cause the pressure of the gas in the chamber L to be less than that in the chamber J; but the pressure in the chamber L operates, as above described, to open the valve F only a sufficient amount to allow the same pressure to pass into the chamber L as in the chamber J, thus entirely eliminating or balancing the friction of the meter before the gas passes through the proportional valve, and thus maintain always the same proportional flow of gas, no matter whether the friction in the meter be high or low. As the flow through the proportional valve is always in absolutely the same ratio, the gas passing through the chamber N will be determined with the utmost precision and accuracy.

In case it is not desired to measure the gas with as much precision as above described, or where a greater fall of pressure between the chambers J and L and the chamber N is permissible, the balance-valve F may be done away with and a solid partition U substituted for the diaphragm I, as the slight difference of pressure in the chambers J and L, due to the friction in the meter C, will then cause but little error in the accuracy of the proportional measurements. As shown in Fig. 2, the operation of the other parts is the same as shown in Fig. 1; but the same accuracy in measurement is not obtained, though the difference in some cases will be slight.

It is obvious that the details of the mechanical construction here shown may be varied almost indefinitely without departing from the spirit of my invention. While I believe the construction here shown to be one of the best adapted for their practical manufacture, yet I do not wish to limit myself to this precise construction, except in so far as may be necessary to come within the scope and intent of this invention.

This meter is designed for measuring fluids of all kinds, though it is especially intended for gas. If used for measuring water, pistons may be substituted for the diaphragm, though this is not absolutely necessary.

Having thus described my invention, I claim—

1. In a proportional meter, a proportional valve controlling two triangular openings, which bear a determined ratio to each other, the center line of which approximately coincides with the center line of the openings, substantially as specified.

2. In a proportional meter, the combination of a receiving-chamber for the unmeasured volume of gas, an outlet-chamber from which the gas is taken, a diaphragm placed between the two chambers, and a proportional valve which is operated by the diaphragm, the larger opening of the valve being placed between the inlet and outlet chambers, and its smaller opening being placed between the delivery side of the meter and the outlet-chamber, substantially as described.

3. In a proportional meter, the combination of a meter with a regulator provided with an inlet-pipe, an outlet-chamber, and a chamber into which the gas from the meter is discharged, the inlet and the meter delivery-chambers being separated from the outlet-chamber by a proportional valve and a diaphragm which operates the valve, substantially as specified.

4. The combination, in a regulator for a proportional meter, of an inlet-chamber, a balance-valve, a diaphragm for operating this valve, a chamber into which the gas passes from the inlet-chamber, a chamber into which the gas is discharged from the meter, a proportional valve, a diaphragm which operates the proportional valve, and an outlet-chamber, substantially as shown and described.

5. In a regulator for a proportional meter, the combination of two diaphragms, a balance-valve which is attached to one of the diaphragms, and a proportional valve which is attached to the other diaphragm, the diaphragms being controlled independently of each other by the pressures of the measured and unmeasured gas, substantially as specified.

In testimony whereof I affix my signature in presence of two witnesses.

FRED E. YOUNGS.

Witnesses:
ALLEN S. PATTISON,
N. DUMONT.